Dec. 19, 1939.  H. E. KAMPF  2,184,079
HOSE LOCKING MECHANISM FOR DISPENSING PUMPS
Filed Feb. 14, 1936  3 Sheets-Sheet 1
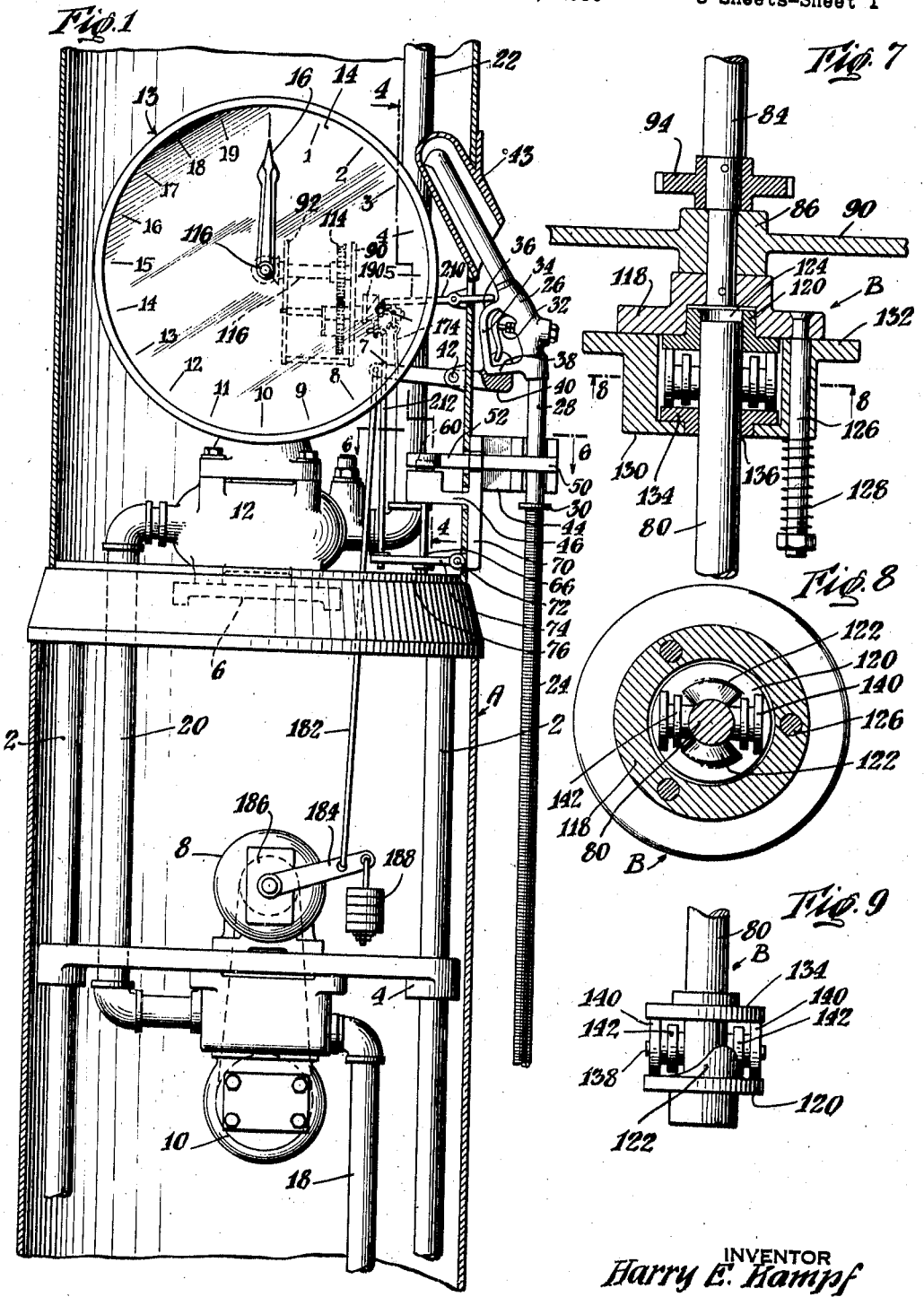

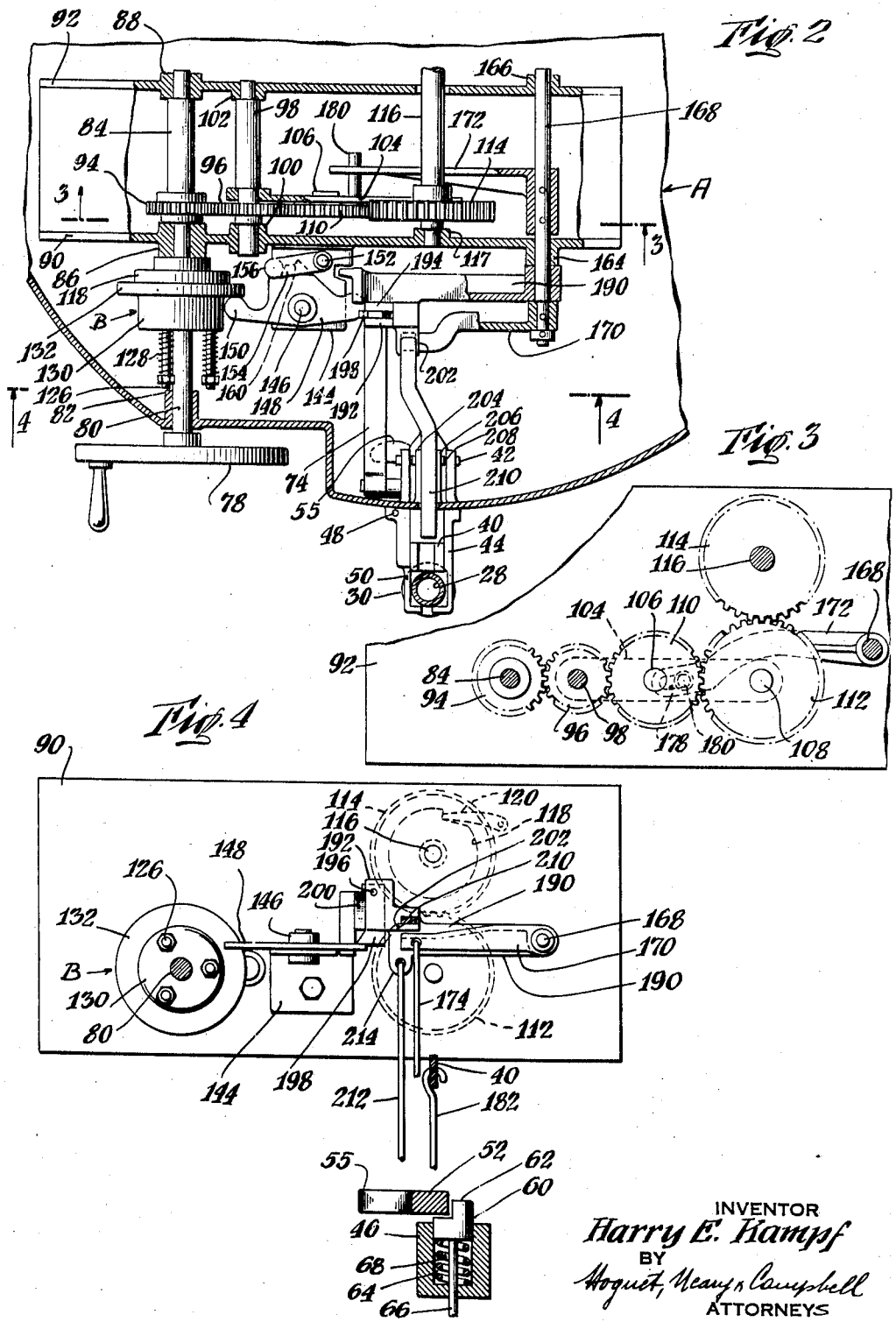

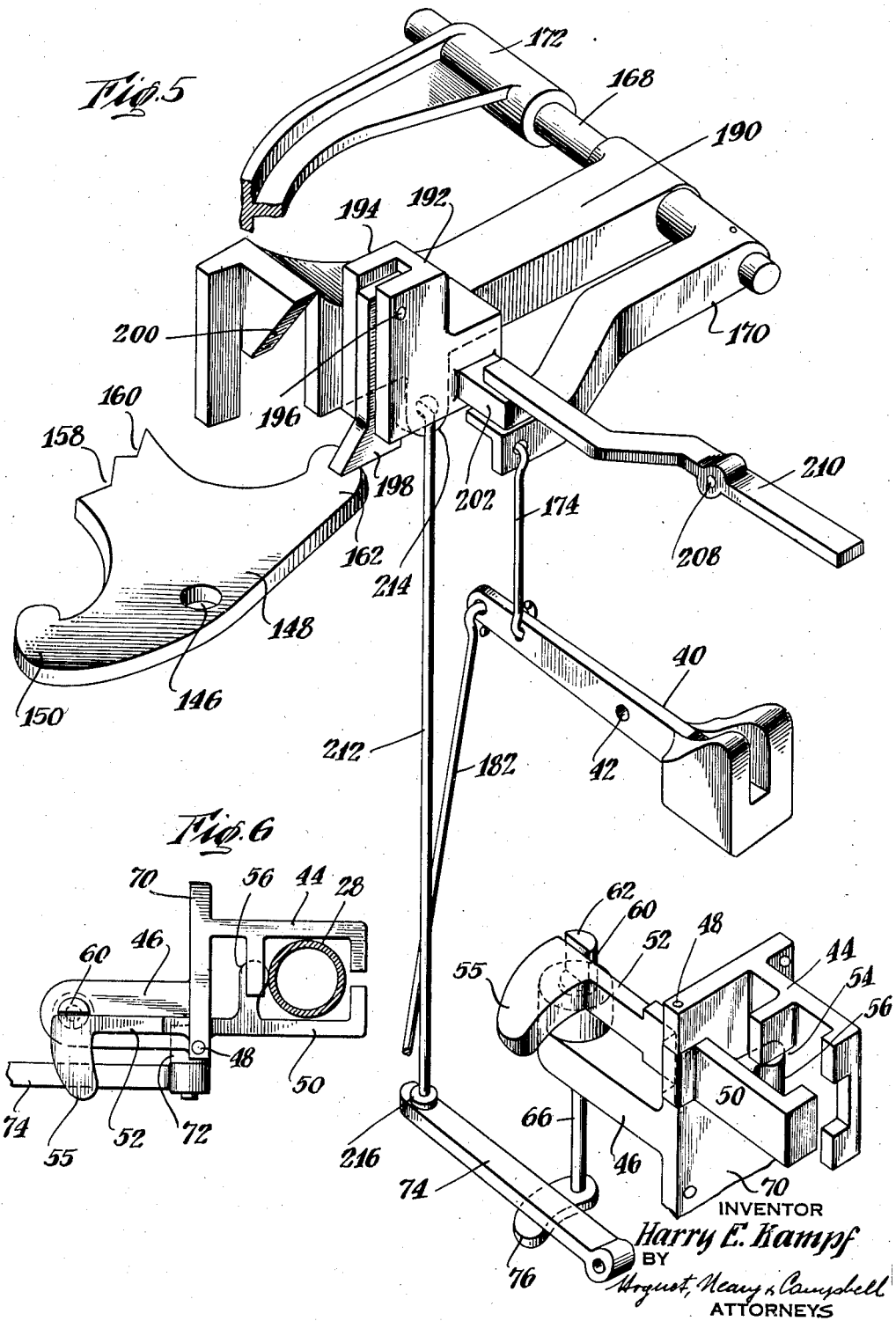

Patented Dec. 19, 1939

2,184,079

UNITED STATES PATENT OFFICE 2,184,079

HOSE LOCKING MECHANISM FOR DISPENSING PUMPS

Harry E. Kampf, Jackson Heights, N. Y., assignor to Neptune Meter Company, a corporation of New Jersey Application February 14, 1936, Serial No. 63,820

12 Claims. (Cl. 221—95)

This invention is directed to a dispensing device having a hose locking means connected with an indicator on the device for preventing removal of the dispensing hose from the locking means prior to the resetting of the indicator to zero position.

Dispensing devices are known in the art in which the means for resetting the indicator to zero position is interlocked with a motor for operating a fluid pump, so that the motor cannot be started to dispense fluid prior to resetting of the indicator to zero position. Devices are also known in which the indicator resetting mechanism is interconnected with a valve in the fluid conduits which only permits the flow of the fluid through the conduits after the resetting of the indicator to zero position. These devices are so interlocked with the resetting mechanism that the resetting operation either simultaneously with or at the conclusion of the resetting operation initiates fluid flow for dispensing purposes.

The present invention differs from these devices in that the pump may be independently controlled and may be started or stopped without manipulating the indicator. In the present device, in order to prevent a fraudulent or inadvertently inaccurate registration of the quantity of fluid dispensed in a dispensing operation, means are provided in connection with the dispensing apparatus for preventing the removal of the dispensing hose from its usual suspended position on the apparatus until after the indicator has been reset to such a position that it will register the exact quantity of fluid delivered by the hose in a subsequent dispensing operation.

Mounted on the housing which encloses the apparatus is a gripping means for receiving and holding an elongated shank on the hose nozzle when the nozzle is suspended from a support on the housing. The hose shank and the gripping means are so proportioned that the hose may be moved longitudinally with relation to the gripping means but may not be removed therefrom until the latter is unlocked. This structure is further connected by an associated train of mechanism to an indicator resetting crank, so arranged and constructed that, upon return of the indicator to zero position, the gripping means is automatically unlocked to permit removal of the hose.

More specifically, the invention includes a movable support for the hose which, upon displacement through a part of its range of possible movement, may actuate a motor switch to start the operation of a pump, and upon displacement of the support through the remainder of its range of movement, unlocks the gripping means so that the hose may be removed. Controlling the range of movement of the support is a member which is displaceable out of engaging position with mechanism connected to the hose-support, said control member being operated through mechanism associated wth the crank for resetting the indicator to its initial position.

The invention also includes a modified structure in which the motor cannot be started nor the hose released from between the gripping means unless the indicator has been returned to zero position. This structure differs from that previously described only in the adjustment of certain parts thereof.

It will thus be seen that after the hose has been returned to the support at the conclusion of a dispensing operation, it is first necessary to reset the indicator on the device to zero or initial position before the hose can be removed again to dispense another quantity of fluid. The structure of the present invention is such as to assure that the quantity of fluid registered on the indicator of the device is an accurate measure of the fluid delivered.

With the foregoing description in mind, reference is made to the accompanying drawings in which:

Fig. 1 is a view in elevation of a dispensing pump embodying the invention, the pump housing being partly broken away in order to show the internal mechanism.

Fig. 2 is a plan view, partly in section and partly broken away, of the details of the indicator resetting means and the hose gripping means.

Fig. 3 is a sectional view taken along line 3—3 of Fig. 2 of the structure disclosed in Fig. 2.

Fig. 4 is a sectional view taken along line 4—4 of Fig. 2.

Fig. 5 is a perspective view illustrating the interlocking connections between the gripping means, the hose support, and the indicator resetting means.

Fig. 6 is a view in elevation of a detail of the hose gripping means.

Fig. 7 is a sectional view of the cam and roller displacement mechanism of the device.

Fig. 8 is a sectional view taken on line 8—8 of Fig. 7, and

Fig. 9 is a plan view of the cam and roller mechanism disclosed in Fig. 7, with the housing removed.

The dispensing apparatus A includes a frame work 2, 4, 6 supporting a motor 8, a pump 10, a nutating disk meter 12, and other appurtenant parts.

Connected to the meter 12 through a suitable system of gearing, is an indicator 13 including a dial 14 and a pointer 16 for registering the quantity of fluid passing through the meter. It will be understood that the dispensing apparatus may be provided with a plurality of indicators if desired, and that these indicators may be of any conventional type. In the gear train connecting meter 12 to the indicator 14, 16 is provided a conventional slip clutch, not shown, permitting the rotation of the indicator hands 16 relative to the meter when the hands are being reset to zero.

Suitable conduits 18, 20, and 22, respectively, are provided, connecting the inlet of the pump 10 to a source of fluid supply, the outlet of the pump 10 to the meter 12, and the meter 12 to a dispensing hose 24 having a nozzle 26. The nozzle 26 is provided with an elongated shank 28 having a flange 30 for a purpose to be described. The nozzle 26 is provided with the usual hand-operated valve 32 and a hand guard 34 provided with a front abutment 36 and a rear abutment 38.

The dispensing apparatus A is provided with hose support 40 upon which the rear abutment 38 of the nozzle 26 rests when the hose is not in use this support being pivotally connected to the apparatus A at 42. If desired, spaced guide plates may be placed on opposite sides of the hose support 40, so that the nozzle 26 may be hung on the support in one position only.

Above the hose support 40 and extending at an angle into the interior of the apparatus A is a socket 43 for receiving the tip of the dispensing nozzle 26. Directly beneath the hose support 40 is located a gripping mechanism for receiving and holding the elongated shank 28 of the nozzle 26. As illustrated in Figs. 5 and 6, the gripping mechanism consists of a fixed E-shaped member 44 attached to the framework of apparatus A, with a fixed extension 46 projecting rearwardly into the housing and pivotally supporting at 48 a similarly shaped, oppositely-directed, F-shaped member 50 having an arm 52 overlying the fixed extension 46. Extending into a slot 54 in the member 44 is a bar 56 on the member 50, arranged so that the shank 28 on the hose nozzle will strike it and close the member 50 about the shank 28 when the hose is hung upon the hose support 40. The gripping means 44 and 50 are so proportioned and spaced that the shank 28 of the nozzle cannot be removed from between them without pivotally swinging 50 relatively to 44, but the shank may be moved up and down between them, the flange 30 limiting the upward movement of the nozzle. A laterally directed-curved extension 55 is also provided on member 50 for a purpose to be described.

A latch consisting of a cylindrical body 60, having upwardly extending lug 62, is disposed in a bore 64 in the extension 46, as is illustrated in Fig. 4. Attached to the body 60 is a spindle 66 extending downwardly through the extension 46. A spring 68 disposed in the bore 64 normally urges the latch upwardly. When the extension 52 is held against movement by lug 62, the gripping members 44, 50 are locked in the closed position indicated in Fig. 5. However, if the latch lug 62 is displaced downwardly, the extension 52 can be swung, opening the gripping means 50, 44, and the curved extension 55 will hold latch lug 62 in its downwardly displaced position.

The base plate 70 carrying the gripping mechanism is provided with lugs 72, between which is pivoted one end of a lever 74 for engagement with a projection 76 on latch spindle 66. Downward swinging movement of lever 74 displaces latch-lug 62 and to effect this movement of lever 74, it is necessary that the indicator 14, 16 first be reset to zero position. The structure for effecting this resetting is illustrated in Figs. 2, 3 and 4. A manual crank 78 on a shaft 80 is coupled to a shaft 84 by a coupling device B, to be described. The shaft 84 is journalled in bearings 86 and 88 in journal plates 90 and 92, respectively.

Pinned to the shaft 84 is a gear 94 meshing with gear 96 mounted on an idler shaft 98 journalled in bearings 100, 102 in the plates 90 and 92, respectively. Loosely mounted on the idler shaft 98 for swinging movement about the shaft, is a lever 104. Rotatably mounted on the lever 104 on stud shafts 106 and 108, respectively, are meshing gears 110 and 112 and rotatable by rotation of shaft 84. Gear 112 is so arranged and located that when the lever 104 is swung to its uppermost position, it meshes with gear 114 pinned to the shaft 116, the latter being journalled in bearing 117 and in the indicator dial 14 and carries the indicator hand 16.

It will be understood that the shaft 116 may be attached to a gear train mechanism for operating the two hands on the indicator, one indicating gallons of fluid dispensed and the other indicating fractions of gallons. For purposes of illustration, however, because the indicating mechanism forms no part of this invention, the shaft is illustrated as directly connected to but one hand, 16. Shaft 116 is connected by the usual gear train to the meter 12.

Also pinned to shaft 116, Fig. 4, is a ratchet 118 having the tooth so located that when a pawl 120 engages the tooth, the hand 16 will be stopped at zero position on counterclockwise turning of the hand, the shaft 116, gears 114, 112, 110, 96 and 94, and shaft 84 accordingly being locked against further counterclockwise movement.

As previously mentioned, crank 78 and shaft 80 are rotatable with respect to shaft 84 through the coupling B. The coupling B, as shown in Figs. 7 to 9, consists of a recessed disk 118, pinned to shaft 84. Secured in disk 118 is a cam member 120 having diametrically spaced cam lobes 122 and a bearing aperture 124 for receiving the end of shaft 80. Attached to disk 118 by means of stud bolts 126 and urged toward the disk by springs 128, is a cup-shaped housing 130 having a flange 132. Secured to housing 130 is a bearing plate 134 having a bearing aperture 136 for the shaft 80. Passing cross-wise through shaft 80 is a pin 138 on each end of which is journalled a pair of rollers 140, 142, of which rollers 140 are of greater diameter than rollers 142 and only rollers 142 engage cam lobe 122.

With this construction, it will be understood that when shaft 84 is locked by pawl 120, further rotation of shaft 80 will cause the rollers 142 to ride up on the cam lobes 122 with rollers 140 bearing against plate 134, thereby displacing housing 130 axially of shaft 80. The axial movement of housing 130 is utilized to control the release of hose gripping members 44 and 50 in a manner to be described.

As shown in Figs. 2 and 4, supported on pivot 146 on a bracket 144 of journal plate 90 is a control member 148 having projection 150, which overlaps the flange 132, whereby axial movement of the housing 130 will displace the control member in counterclockwise direction as viewed in Fig. 2. Also, supported on bracket 144 by pivot 152 is a latch 154 having a lug 156 engageable in notches 158 and 160 in one edge of the control member 148 to retain it in either the position disclosed in Fig. 2 or in its displaced position.

Loosely supported in bearings 164 and 166 in journal plates 90 and 92, is a shaft 168 carrying levers 170 and 172 on opposite sides of journal plate 90 (See Fig. 2). Lever 170 is connected by a link 174 to hose support 40 (Figs. 1, 4, and 5) for movement therewith. As best shown in Figs. 2 and 3, lever 172 has an elongated slot 178 receiving a pin 180 attached to gear train lever 104, for the purpose of swinging the last-mentioned lever about shaft 168 to engage or disengage gears 112 and 114. Also, connected to the hose support 40 is a link 182 (Figs. 1 and 5) which is attached to an arm 184 extending from a motor switch 186. At the outer end of arm 184 is attached a weight 188 of such mass that, while incapable of pulling the hose support 40 downwardly when the hose nozzle is hung thereon, it will do so when the nozzle is removed from the support. It will thus be seen that when the nozzle is removed or lifted from the hose support 40, the motor switch will be moved to "on" position, starting the motor and the pump and the gear 112 will be disengaged from the pinion 114, thereby freeing the indicator shaft for movement with the meter to register the quantity of fluid passing through the meter.

Mounted on shaft 168 and movable with respect thereto, is a latch 190 having a pair of spaced lugs 192 and 194 between which is mounted, by pivot 196, a latch 198, which normally overlies and engages the projection 162 on control member 148. Projecting from the opposite edge of the latch lever 190 is an inclined cam surface 200 which is engageable with projection 162 when the latter is in its displaced position and upon downward movement of latch lever 190, restores the control member to the position shown in Fig. 2. Projecting from the side of pivot lug 192 is a laterally disposed lug 202 overlying the end of lever 170 so that upward movement of lever 170 will cause the latch lever 190 to move upwardly, also.

Extending substantially parallel to shaft 168 and pivoted at 208 in bearing lugs 204 and 206, is a flat lever 210, one end of which overlies abutment 36 on the nozzle hand guard 34 when the nozzle rests on the hose support, as is shown in Figs. 1 and 2. The other end of flat lever 210 overlies lug 202 on latch lever 190 (Figs. 2 and 5), so that upward movement of the nozzle rocks the lever 210 counterclockwise against lug 202, thereby forcing latch lever 190 downwardly. The downward movement of lever 190 is transmitted to lever 74 by a link 212 attached to lever 190 through lug 214 and to lever 74 by a loose connection 216. The link 212 is provided with a fixed abutment washer which maintains a predetermined spacing between lever 190 and lever 74. The link 212, if desired, can be connected directly to the flat lever 210 and thereby cause lever 74 to move positively with lever 210.

The end of lever 210 which overlies abutment 36 on the nozzle hand guard may be so arranged that it engages the abutment normally, and forces the opposite end into contact with lug 202, or it may be spaced from the abutment 36, so that the hose support 40 may be displaced a sufficient distance by upward movement of the nozzle to move the motor switch to "on" position, thereby starting the motor and disengaging gear 112 from pinion 114. As the lever 170 moves independently of the latch lever 190, it will have no effect on the gripping means latch 62.

In operation, assuming a dispensing operation to have been completed, the nozzle 26 on the support 40 is held in the gripping means 44, 50 and the indicator 14 registers the quantity of the fluid dispensed in the preceding operation. If the nozzle 26 is lifted, the lever 210 will force the latch member 198 downwardly against the projection 162 on the control member 148. If sufficient clearance is left between the lever 210 and the abutment 36 on the hose hand-guard, the motor switch 186 will be thrown to "on" position and the motor will start, at the same time disengaging the end gear 112 of the resetting gear train from indicator shaft pinion 114. However, the gripping means will not be released, the hose cannot be removed therefrom and no dispensing operation can take place. If there is no clearance left between the end of lever 210 and the abutment 36 on the nozzle, the hose cannot be lifted and the motor switch cannot be moved to "on" position. In either instance, the hose cannot be removed until the indicator is reset to zero and this is accomplished in the following manner:

With the nozzle 26 resting on the support 40, the resetting crank 78 is rotated, thereby turning shafts 80, 84, 98 and 116 through gears 94, 96, 110, 112 and 114, and the indicator hand 16 will be turned counterclockwise to zero position, where the pawl 120 and the notch in ratchet 118 will engage to prevent further rotation of shafts 116, 98 and 84, and gears 94, 96, 110, 112 and 114. Further rotation of crank 78 and shaft 80 will cause the rollers 142 to ride up on the cam lobes 122 and rollers 140 to displace housing 130 axially of shaft 80, throwing control member 162 out of position for engagement with latch 198. The hose nozzle 26 may then be lifted displacing latch lever 190, motor switch arm 184 and lever 170 downwardly, moving latch 60, 62 out of locking engagement with the movable gripping member 50, so that the latter may be swung open and the nozzle shank 28 removed therefrom ready for the dispensing operation. During downward movement of a latch lever 190, the inclined cam surface 200 engages the end 162 of the control member 148, restoring it to its original position. Return of the hose nozzle to the support stops the motor by moving the switch to "off" position. Lever 170 contacting with lug 202 swings the latch lever 190 above the control member 148, latch 198 swinging back to pass the projection 162. The hose shank 28 striking lever 56, closes the gripping means 44, 50, swinging the arm 52 beyond the latch lug 62 which rises upwardly, thereby latching the gripping means 44, 50 in closed position. The end gear 112 of the gear train also engages the pinion 114 on the indicator shaft 116 thereby restoring the resetting connection between crank 78 and the indicator shaft 116.

It will thus be seen that a device has been produced in which a dispensing operation cannot take place unless the indicator has been so reset that a subsequent dispensing operation will accurately register the quantity of fluid dispensed.

It will be obvious that there can be many variations in the structure disclosed, such as variations of the means for latching the hose to the housing, that the dispensing device as a whole will have many uses other than those disclosed and that the latching means can be applied to devices other than a dispensing pump, all of which fall within the scope of the invention as defined in the following claims.

I claim:

1. A dispensing pump comprising an indicator, means for resetting the indicator to zero, dispensing means consisting of a hose and nozzle, a source of liquid supply to which said dispensing means are connected, means for initiating and terminating flow of liquid from said source to said dispensing means, a movable support for the dispensing means controlling operation of said means for initiating and terminating flow of liquid, releasable gripping means for gripping the dispensing means to retain the latter on the support constructed to permit movement of the dispensing means relatively to said gripping means to actuate said initiating means and means operatively connected to the resetting means and actuated by movement of the dispensing means for releasing the gripping means to allow removal of the hose from the support only after the indicator has been reset to zero.

2. A dispensing device comprising an indicator, means for resetting the indicator, a hose and nozzle connected to a source of fluid supply, a support for the hose and nozzle, pivotally connected gripping members for retaining the hose and nozzle on the support, a latch for holding the gripping members in clamping relation to prevent removal of the hose and nozzle from the support, and means operatively connected to the resetting means controlling the operation of the latch to permit release of the hose from the gripping means only after the indicator has been reset to zero.

3. A dispensing device comprising an indicator, means for resetting the indicator to zero, a hose and a nozzle connected to a source of liquid supply, a movable support for the hose and nozzle, means controlled by said movable support for delivering liquid from the source of liquid supply through the hose, means for retaining the hose and nozzle on the support, a movable latch for releasably locking the retaining means to prevent removal of the hose and nozzle from the support, means operatively connected to the resetting means for controlling movement of the latch to positions for locking and releasing the retaining means and means actuated in response to movement of the hose and nozzle for moving the latch to release the retaining means only when the indicator is at zero position.

4. A dispensing device comprising an indicator, means for resetting the indicator to zero, a hose including a nozzle connected to a source of fluid supply, a movable support for the hose and nozzle, two pivotally connected gripping members for retaining the hose and nozzle on the support, one of said gripping members having an arm thereon, a latch engageable with the arm for holding the gripping members in gripping relation to the hose, means for displacing the latch upon movement of the support, and means actuated by the resetting means for limiting movement of the support through an insufficient distance to displace the latch from engagement with the arm prior to return of the indicator to zero.

5. A dispensing device comprising an indicator, means for resetting the indicator to zero, a hose including a nozzle connected to a source of supply, a support for the hose and nozzle, a fixed gripping member and a movable gripping member, a latch engageable with the movable gripping member to hold it in gripping relation to the first gripping member and to the hose and nozzle when they are supported on the support, a movable control member operatively connected to the latch and to the resetting means and displaceable by the latter when the indicator has been reset to zero to permit release of the movable gripping member by the latch.

6. A dispensing device comprising an indicator, means for resetting the indicator to zero, a hose including a nozzle connected to a source of supply, a movable support for the hose and nozzle, gripping means for retaining the hose and nozzle on the support, a latch for locking the gripping means to prevent removal of the hose and nozzle from the support, means for displacing the latch upon movement of the support, control means for limiting the movement of the support and latch prior to resetting the indicator to zero, and displaceable by the resetting means after the indicator has been reset to zero, to release the latch and support for movement sufficient to unlock the gripping means to permit removal of the hose from the support.

7. A fluid dispensing device comprising means for initiating fluid flow, an indicator for registering the quantity of fluid dispensed, means for resetting the indicator to zero, a hose and nozzle for dispensing the fluid, a movable support for the hose and nozzle connected to the means for initiating fluid flow, gripping means for retaining the hose and nozzle on the support, a latch for locking the gripping means to prevent removal of the hose and nozzle from the support, means for displacing the latch upon movement of the support, means for limiting the movement of the support and latch prior to resetting the indicator to zero and displaceable by the resetting means after the indicator has been reset to zero, to release the latch and support for movement sufficient to unlock the gripping means to permit removal of the hose and nozzle from the support.

8. A fluid dispensing device comprising an indicator movable away from a predetermined initial position in proportion to the quantity of liquid dispensed, means for resetting the indicator to said initial position, means for initiating fluid flow, a movable support for a dispensing hose and nozzle connected to the means for initiating fluid flow, means associated with the resetting means for gripping and retaining the hose and nozzle on the support until the indicator has been reset to initial position but permitting movement of the hose relative to said retaining means to move the support and initiate fluid flow.

9. In a liquid dispensing device, means for establishing liquid flow, an indicator movable away from an initial position in proportion to the quantity of liquid dispensed, means for resetting said indicator to said initial position, dispensing means comprising a hose and a nozzle, a movable support for the dispensing means, means controlled by the resetting means for gripping the dispensing means to retain it on the support, means operatively connecting the support to the liquid flow establishing means and to the gripping means, movement of said support initiating operation of the flow establishing means, and after the indicator has been reset to initial position, releasing the gripping means.

10. In a liquid dispensing device having a housing, a dispensing means consisting of a hose and nozzle, a pump for supplying liquid to said hose and nozzle, and an indicator movable away from an initial position in proportion to the quantity of liquid dispensed; the combination of means for resetting said indicator to initial position, a support for said dispensing means located on said housing, means cooperating with said support when the dispensing means is supported thereon for rendering said pump inoperative, and for rendering the pump operative when said dispensing means is moved relatively to said housing, and means including a movable holding member controlled by said resetting means for retaining and releasing said dispensing means, said holding member being so constructed that when it is in the retaining position it will allow said dispensing means to have a limited movement relative to said housing but will prevent removal of said dispensing means from said support until said indicator is returned to initial position.

11. In a liquid dispensing device, the combination of a dispensing hose having a nozzle, a support for said nozzle, an indicator movable away from an initial position in proportion to the quantity of liquid dispensed, means for resetting the indicator to said initial position, and means for retaining the nozzle with limited freedom of movement on said support when the indicator is displaced from initial position comprising an element movable to nozzle retaining and releasing positions, means controlled by said resetting means for releasably locking said element in nozzle retaining position, means actuable by the limited movement of the nozzle when the indicator is at initial position for releasing said element, and means engageable by said nozzle for moving the element to nozzle retaining position when the nozzle is placed on the support.

12. In a liquid dispensing device, the combination of a dispensing hose having a nozzle, a support for said nozzle, an indicator movable away from an initial position in proportion to the quantity of liquid dispensed, means for resetting the indicator to said initial position, and means for retaining the nozzle with limited freedom of movement on said support when the indicator is displaced from said initial position comprising an element movable to retaining and releasing positions, means for releasably locking said element, including a member actuatable by the limited movement of the nozzle when the indicator is at initial position to release said element to allow removal of the nozzle from the support and means engageable by said nozzle for moving said element into locking relation with said releasable means when the nozzle is placed on the support.

HARRY E. KAMPF.